UNITED STATES PATENT OFFICE.

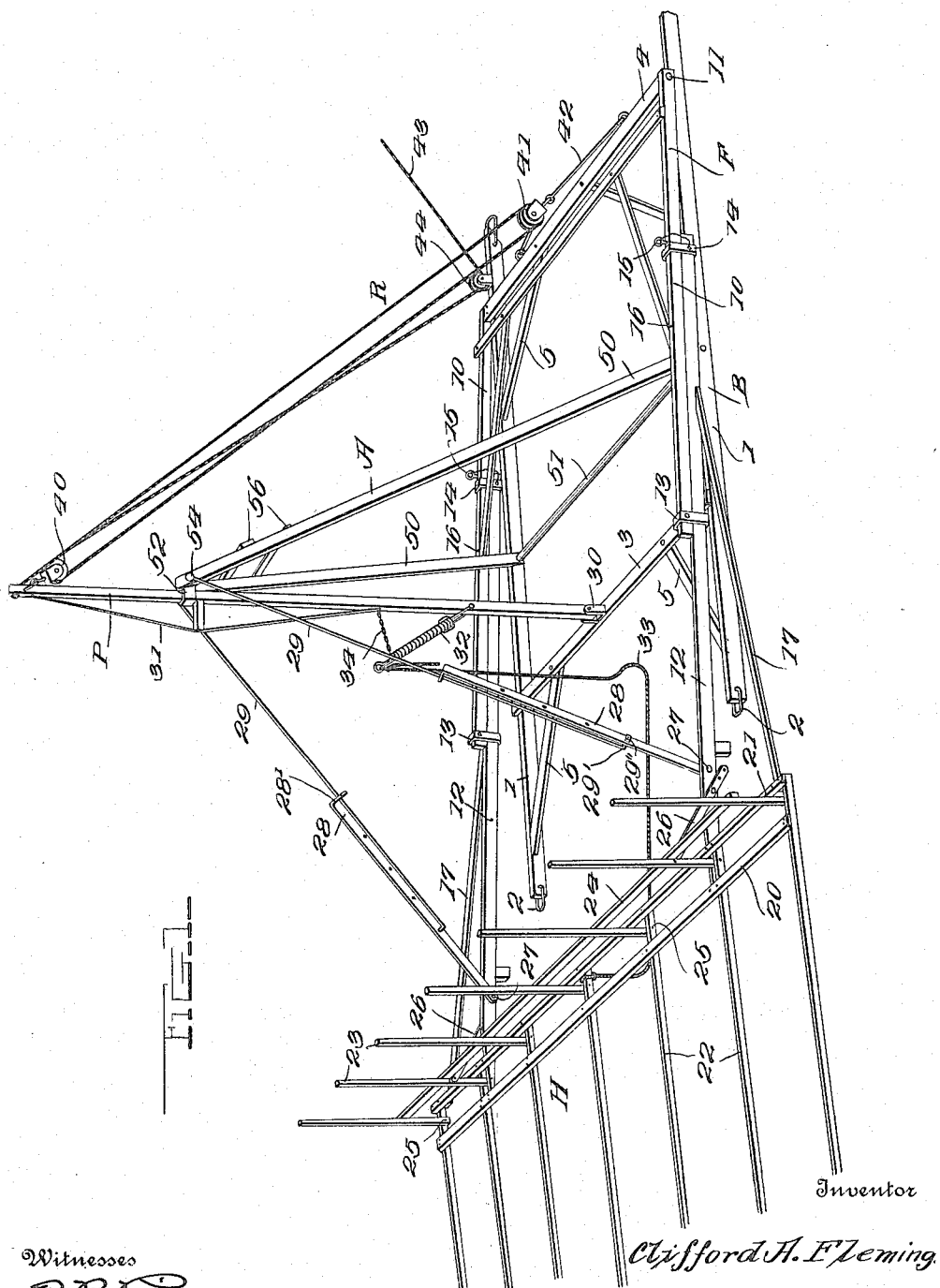

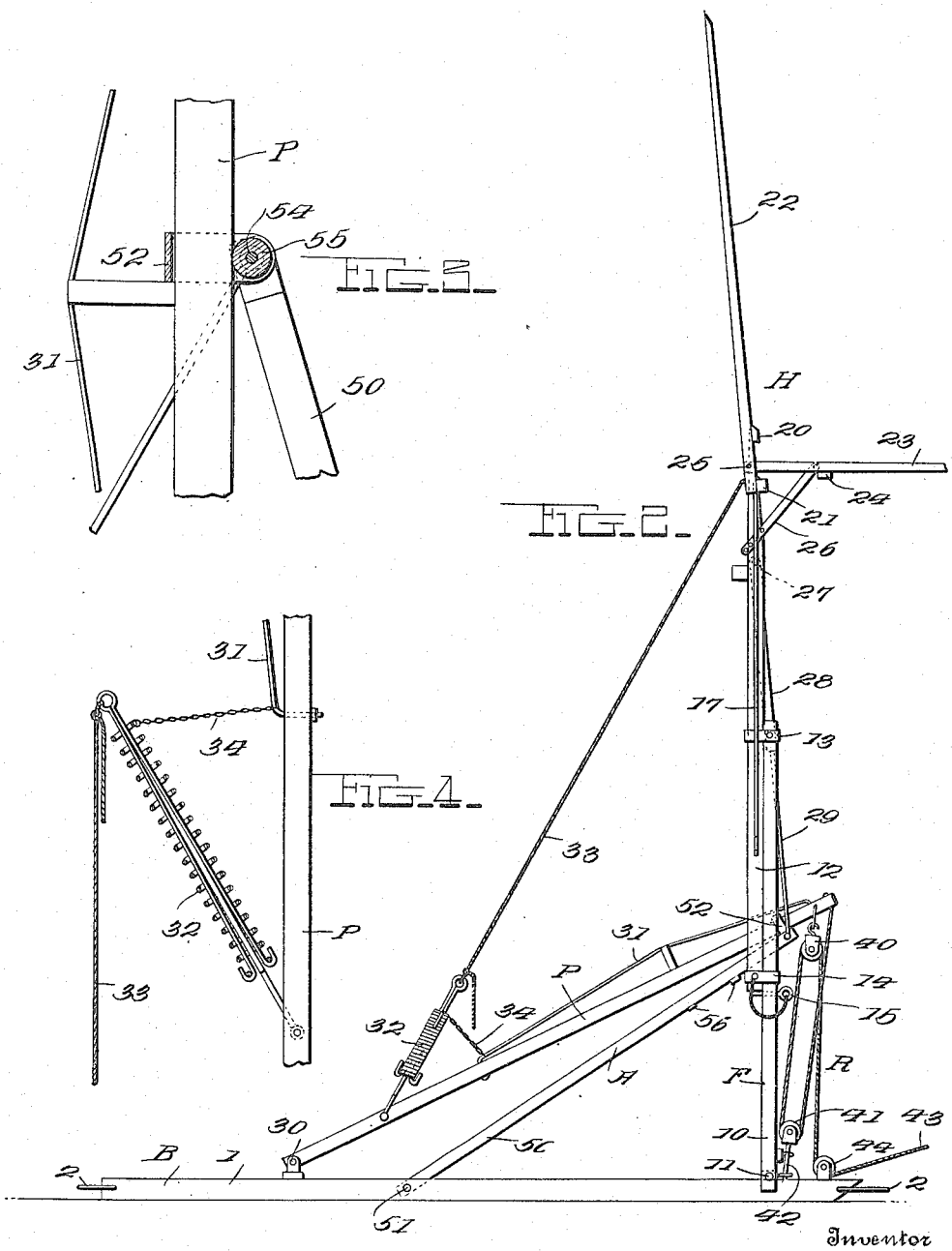

CLIFFORD A. FLEMING, OF HUNTSVILLE, MISSOURI.

HAY-STACKER.

1,135,369. Specification of Letters Patent. Patented Apr. 13, 1915.

Application filed November 3, 1913. Serial No. 799,017.

*To all whom it may concern:*

Be it known that I, CLIFFORD A. FLEMING, a citizen of the United States, residing at Huntsville, in the county of Randolph and State of Missouri, have invented certain new and useful Improvements in Hay-Stackers; and I do declare the following to be a full, clear, and exact description of the invention, such as will enable others skilled in the art to which it appertains to make and use the same.

This invention relates to loading and unloading, and more especially to means for stacking or piling hay; and the object of the same is to produce improved means for applying power to raise the stack of hay.

This and other objects are carried out by constructing the stacker in the manner hereinafter more fully described and claimed, and as shown in the drawings wherein—

Figure 1 is a perspective view of this entire device ready for use, and Fig. 2 is a side elevation showing the head as raised. Fig. 3 is a detail on an enlarged scale showing the connection between the A-frame and pole, the parts being in section; and Fig. 4 is an enlarged side elevation of the spring.

In the drawings the letter B designates broadly a base to which is pivoted a stacker frame F carrying the usual or any preferred type of head H, P is a pole also pivoted to said base and connected with the head through the instrumentality of an A-shaped frame A which also is pivoted on the base, and R are the ropes or block and tackle mechanism for moving the pole. These parts will now be described separately.

The base B is composed of a pair of runners 1 (or it might be a wheeled frame if desired) having loops or eyes 2 at their extremities to which a whiffletree may be attached for drawing the stacker over the ground, and these runners are suitably connected by cross bars 3 and 4 braced as at 5 so that as light a structure is built up consistent with its considerable size as possible, and the whole by preference lies close to the ground.

The stacker frame F consists of a pair of side bars 10 pivoted at one end as at 11 to the base, a second pair of side bars 12, loops 13 and 14 secured respectively to the bars 10 and 12 and each loop embracing one of the other bars so that the latter are telescopically or slidably mounted on each other, pins 15 passing through holes 16 in the bars to hold them in adjusted position, and braces 17 leading from the outer bars 12 to the head.

The stacker head H consists of cross bars 20 and 21 to which the outer bars 12 and the braces 17 are attached in any suitable manner, and longitudinal fingers 22 and lateral fingers 23, the latter connected by a cross bar 24 and pivotally mounted as at 25 on the longitudinal fingers. Thus is produced a movable structure comprising the lateral fingers and the bar connecting them, and braces 26 project rearwardly from these fingers and are pierced with a number of holes whereby they are adjustably bolted to the bars 12. Each of the latter is connected with the upper end of the A-shaped frame by a longitudinally adjustable element comprising a lower member 28 of strap iron pivoted at 27 to the arm 12 and having its upper end turned aside as at 28' and pierced with an eye, and an upper member 29 which is a rod connected at its upper end with the frame A, its body passing through said eye, and its lower end turned aside into an elbow 29' which passes through one of a number of holes in the member 28 and receives a nut 29''. By removing the latter and withdrawing the elbow and inserting it in one of the other holes, the length of this element may be adjusted as desired.

The pole P is pivotally supported in a yoke 30 mounted on the rearmost cross bar 3 and rises therefrom to a considerable height—greater, in fact, than the height of the A-shaped frame A. On account of its length it is by preference braced by a truss 31 on its forward side, as shown. Near its lower end it carries a spring 32, whose upper extremity is connected by a rope 33 with the head H, and a chain 34 or like flexible element holds this spring in active position.

The block-and-tackle mechanism R consists of a pulley 40 connected with the upper end of the pole, a second pulley 41 connected with the center of a bail 42, which in turn is connected to the front cross bar 4, a rope 43 leading from the upper end of the pole around the lower pulley and thence upward over the upper pulley, and another pulley 44 detachably connected with one front corner of the base and under which this rope is led before being carried to a distance and attached to a whiffletree or singletree so that a team or a horse may be employed to raise the stacker as usual.

The A-frame A consists of two side bars 50 pivotally mounted at their lower ends on a cross rod 51 within the base B and converging thence to their upper ends which nearly meet but are connected by a U-shaped guide 52 through which the pole P is slidably mounted. The bolt 54 which passes through the ends of the side bars and the ends of the guide also carries a pulley or roller 55 against which the rear edge of the pole P rests, whatever the position of parts. The side bars are suitably braced as at 56. The apex of this frame stands normally somewhat below the upper end of the pole P, and the disposition of the cross rod 51 with respect to the pivot of the pole is such that when the latter is drawn downward as seen in Fig. 2 the guide and roller at the upper end of the A-frame will not contact with the pulley 40 at the upper end of the pole. In other words, the pole is taller than the frame and the pivotal supports of these two elements are spaced some distance apart on the base B. The pulley 44 is detachably connected with either front corner of the base so that the horse or horses for lifting the load may be located at either side of the same as convenience may dictate. The upper end of the rod 29 is connected with the bolt 54 which carries the roller as shown.

With this construction of parts, the operation of the machine is as follows: The base with the superimposed structure being drawn to the point of use and probably staked to the ground, the hay is drawn to the stacker or in some manner thrown onto the longitudinal fingers of the head H until a considerable charge is placed thereon. Then the team or horse is started up and the rope draws on the upper end of the pole which at this time stands upright as seen in Fig. 1 with the result that the pole moves from this position rearward and downward—traveling over the roller at the head of the A-frame which latter also turns on its pivot. The guide keeps the parts in relative position near their upper ends, and the tension of the rope draws the pole constantly against the roller so that the advantage of disposing the pole forward of the A-frame rather than to the rear of it as is common, will be obvious. At the beginning of the upward movement of the load on the head H, said load is lifted almost vertically because of the length of the combined side bars 10—12, and as the stacker frame swings around its pivots 11 the weight of the load is thrown more and more onto them and the force necessary to lift it becomes less and less. The pole moves from the position shown in Fig. 1 through a path to the rear and carries the A-frame with it, the telescopic rods connecting the upper end of the A-frame with the head H and raising said head in a manner which will be clear.

Finally the parts reach the position shown in Fig. 2 and the rope R draws on the spring 32 to check the further upward movement of the head. This occurs rather suddenly so that the load of hay on the head is tossed off of it onto the stack being formed. The horse is then backed and the head lowered to its original position for a new load. When it is desired to adjust the distance of the head from the pivotal line 11, the side bars 10—12 are adjusted over each other as their loops 13—14 will permit, and finally the pins 15 are inserted in the proper holes to hold them when adjusted. Meanwhile the telescopic rods 28—29 will also be adjusted in a manner which will be clear. To store the device in small space these adjustments are also useful, and they will doubtless be employed before dragging the stacker back to the barn or other place of storage. The parts are by preference made as far as possible of wood, with metal for the hardware, either of galvanized iron or suitably treated to prevent rust. I do not wish to be limited to the proportions of parts, nor in fact to the strict details of construction. I find the loop or bail on the forward cross bar 4 to be of advantage because it throws the strain of the rope mechanism R onto two points within the length of this cross bar, and therefore permits the latter to be made of lighter lumber than if the strain were all thrown onto the center of it. The most important feature of this invention, however, consists, in my opinion, of the disposition of the long pole P forward of the A-frame A, the pivoting of it at its lower end on the base B, connecting the rope mechanism R with its upper end, and the mounting of a roller and guide in the top of the frame so that the pole travels within this guide and over the roller as the load is lifted. Especially do I consider it of advantage to dispose the pole forward of the A-frame rather than in rear of it, and to space the pivots or supports at the bottom of these elements so that the frame turns about a center or pivot which is different from that of the pole. I find by experience that one horse will lift a considerable load on the head H when the mechanism is constructed as has been shown and described, and yet the stacker frame is adjustable to quite small compass so that the entire device can be stored in an ordinary barn.

What is claimed as new is:

1. In a hay stacker, the combination with a base, a stacker frame pivoted at one end thereto, and a head carried on the other end of the frame; of a cross bar near the forward end of the base, a pole pivotally mounted at its lower end on said cross bar, rope mechanism connected with the upper end of said pole, an A-shaped frame pivoted on the base in rear of said cross bar and pole, a roller carried on the front face of said frame and over which the rear edge of the pole travels, means for holding said pole in engagement with said roller and permitting it to slide freely relative to said frame and connections between the upper end of said A-shaped frame and the stacker head.

2. In a hay stacker, the combination with a base, a stacker frame pivoted at one end thereto, and a head carried on the other end of the frame; of a cross bar near the forward end of the base, a pole pivotally mounted at its lower end on said cross bar, rope mechanism connected with the upper end of said pole, an A-shaped frame pivoted on the base in rear of said cross bar and pole, a bolt across the upper end of the A-frame, a guide on the front face of said frame and carried by said bolt and loosely embracing the pole, a roller journaled on the bolt and bearing continuously against the rear edge of the pole, and rods connecting said bolt with the stacker head.

3. In a hay stacker, the combination with a base, a stacker frame pivoted at one end of said base, and a head carried by said frame; of a cross bar near the forward end of the base, a pole pivotally mounted at its lower end on said cross bar, rope mechanism connected with the upper end of said pole, an A-shaped frame pivoted on the base in rear of said cross bar and pole, the upper end of said A-frame and pole being held in close proximity with the A frame always at the rear of the pole, a guide carried by said frame and loosely embracing the pole, a roller journaled in said guard and bearing against the rear edge of the pole, and means connecting said bolt with said head.

In testimony whereof I have hereunto set my hand in presence of two subscribing witnesses.

CLIFFORD A. FLEMING.

Witnesses:
JIM L. HAMMETT,
A. B. RICHMOND.

Copies of this patent may be obtained for five cents each, by addressing the "Commissioner of Patents, Washington, D. C."